United States Patent [19]
Czarnecki et al.

[11] Patent Number: 6,083,418
[45] Date of Patent: Jul. 4, 2000

[54] DENSITY STABILIZED PHASE CHANGE MATERIAL

[75] Inventors: David John Czarnecki, Racine; James A. Robinson, Franklin, both of Wis.

[73] Assignee: Modine Manufacturing Company, Racine, Wis.

[21] Appl. No.: 09/290,326

[22] Filed: Apr. 12, 1999

Related U.S. Application Data

[63] Continuation-in-part of application No. 09/088,631, Jun. 2, 1998, abandoned.

[51] Int. Cl.⁷ .............................. C09K 5/06; C09K 5/00; C09K 5/02
[52] U.S. Cl. .............................. 252/70; 252/71; 126/910; 165/10; 165/902
[58] Field of Search .................... 252/70, 71; 106/13; 126/910; 165/902, 10

[56] References Cited

U.S. PATENT DOCUMENTS

| | | | |
|---|---|---|---|
| 4,421,661 | 12/1983 | Claar et al. | 252/70 |
| 4,503,838 | 3/1985 | Arrhenius et al. | 126/263.03 |
| 4,645,612 | 2/1987 | d'Huysse et al. | 252/70 |
| 5,085,790 | 2/1992 | Hormansdorfer | 252/70 |
| 5,755,987 | 5/1998 | Goldstein et al. | 252/70 |
| 5,785,884 | 7/1998 | Hammond | 252/70 |

FOREIGN PATENT DOCUMENTS

| | | |
|---|---|---|
| 365623 | 10/1993 | European Pat. Off. . |
| 616630 | 9/1994 | European Pat. Off. . |
| 4203835 | 8/1993 | Germany . |
| 9312193 | 6/1993 | WIPO . |

OTHER PUBLICATIONS

Heat Storage Battery for Car Applications, W. Zobel and R. Strähle, IMechE 1995, (no month).
German Patent Abstract No. DE004141306A1, abstract of German Patent Specification No. 4141306 (Jun. 1993).
German Patent Abstract No. DE003929900A1, abstract of German Patent Specification No. 3929900 (Mar. 1991).

*Primary Examiner*—Anthony Green
*Attorney, Agent, or Firm*—Wood, Phillips, VanSanten, Clark & Mortimer

[57] ABSTRACT

A phase change material for use in a heat battery is provided which includes a salt of hydrated Group IIA metal nitrate and Group IA metal nitrate and an effective amount of an aqueous material sufficient to cause the densities of the liquid and solid phases of said phase change material to be approximately equal during phase transformation. A method of making the phase change material and a heat battery which contains the phase change material are also provided.

20 Claims, 4 Drawing Sheets

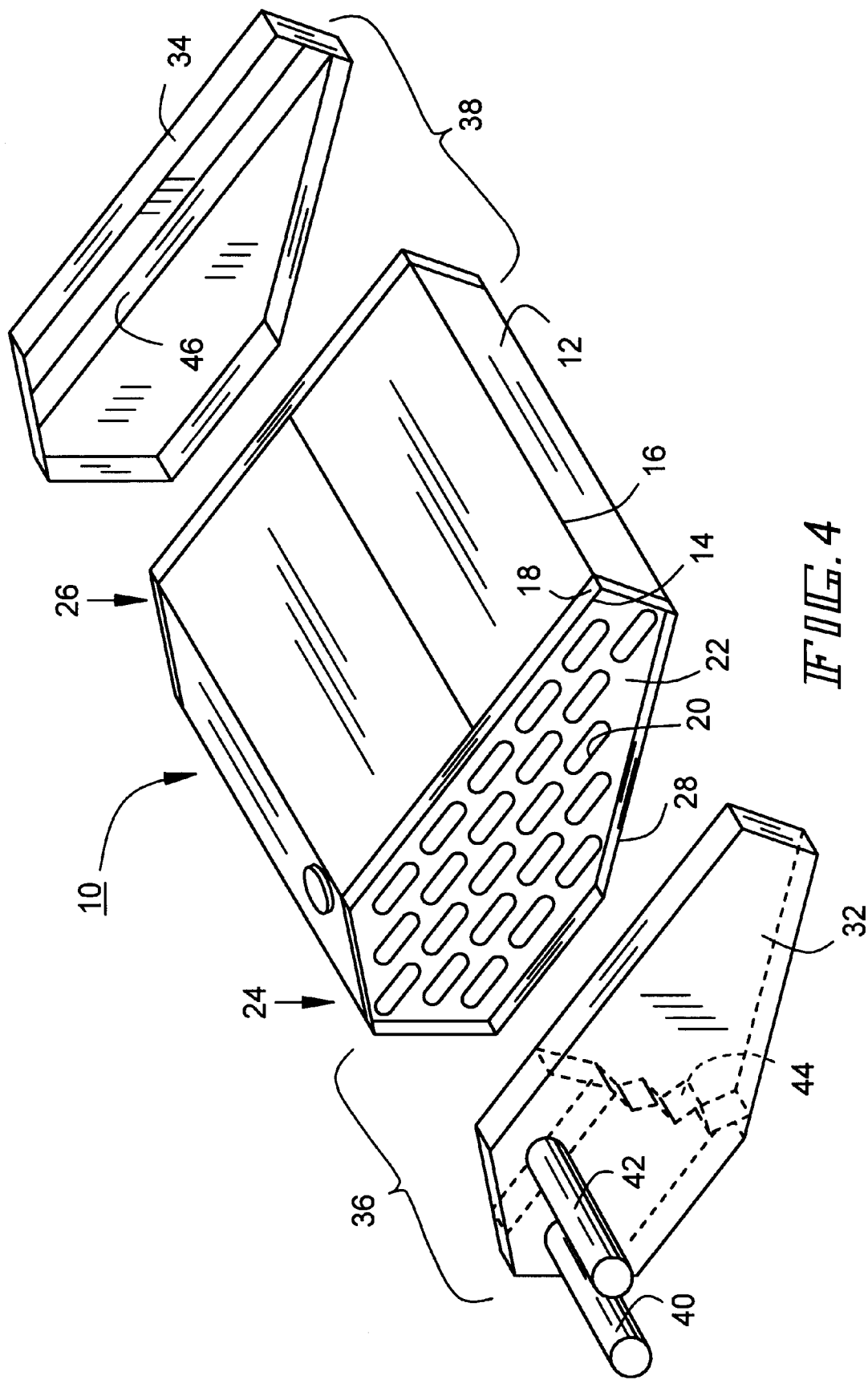

6,083,418

DENSITY STABILIZED PHASE CHANGE MATERIAL

CROSS REFERENCE

This application is a continuation-in-part of application Ser. No. 09/088,631 filed on Jun. 2, 1998 and now abandoned.

FIELD OF THE INVENTION

This invention is directed to a phase change material, and in particular to a density stabilized phase change material.

BACKGROUND OF THE INVENTION

A phase change material is a material which undergoes a phase change, typically between the liquid and solid phases. Phase change materials are frequently used in energy storage applications because larger amounts of energy can be stored as latent heat, i.e. the energy released by solidification or required for liquefaction, than as sensible heat, i.e. the energy needed to increase the temperature of a single phase material.

One phase change material that has come into widespread use is a salt of magnesium nitrate hexahydrate and lithium nitrate. Several different formulations have been proposed for the ratio of magnesium nitrate hexahydrate to lithium nitrate used to prepare the salt. EPO Patent No. 365,623 discloses a salt formed with magnesium nitrate hexahydrate/lithium nitrate ratios of between 92:8 and 87:13. EPO Patent No. 616,630 discloses a salt with ratios of between 86:14 and 81:19. The salts disclosed in the EPO Patents have a melting point temperature of about 70° Centigrade and a latent heat on the order of 180 J/g. Additionally, the salts are also biodegradable and non-toxic.

These salts are particularly significant because the operating characteristics of the salts allow them to be used in heat batteries for energy storage in vehicles, such as automobiles. Their melting temperature is within a range that is suitable for efficient heat transfer in automotive applications, and the energy capacity of the material is large enough so that a significant amount of energy can be stored in a device of limited size and weight. A heat battery using the magnesium nitrate hexahydrate/lithium nitrate salts discussed above can release 750–800 Wh for a rapid discharge of 300 seconds.

However, the salts also have several disadvantageous characteristics which complicate their use in automotive heat batteries. Chiefly, the density of the salt in the solid state is much greater than the density of the salt in the liquid state. As a result, the density change during thermal cycling, which is reflected in a corresponding volume change, can cause deformation of the heat battery components as the material result, the density change during thermal cycling, which is reflected in a corresponding volume change, can cause deformation of the heat battery components as the material changes between the solid and liquid phases. The damage caused thereby can be exacerbated by localized melting of the salt, wherein the portion of the salt closest to the heat source melts first, forming a less dense liquid phase which forces the more dense solid phase against the components of the heat battery. In fact, it is possible for the change in density to deform the heat battery components to such an extent that the heat battery fails.

Even non-catastrophic cyclical deformation of the heat battery components can have farther ranging consequences when, as is normally the case, the heat battery is made of aluminum. Typically, aluminum will form an oxide layer which acts as a passivation layer or barrier to further corrosion of the material. The cyclic deformation of the heat battery components caused by the phase change material as the material transforms between liquid and solid phases causes defects to form in the protective aluminum oxide layer, thereby disrupting the protective passivation layer and opening the door to possible corrosion. At the defects, bare aluminum is exposed to nitrate compounds and corrodes. Considerable amounts of gases are generated within the battery as a consequence of the corrosion process. Eventually, the pressure from the increasing amount of corrosion gases contained within the heat battery causes the heat battery to rupture and fail.

One solution that has been proposed to limit the pressure buildup within the heat battery is to equip the heat battery with a relief valve to exhaust the corrosion gasses. This solution, however, adds significantly to the cost and complexity of the heat battery.

SUMMARY OF THE INVENTION

According to an aspect of the present invention, a phase change material includes a salt of a hydrated Group IIA metal nitrate and a Group IA metal nitrate, and an effective amount of an aqueous material sufficient to cause the densities of the liquid and solid phases of said phase change material to be approximately equal during phase transformation. The hydrated Group IIA metal nitrate may be a hydrated calcium nitrate (e.g., calcium nitrate tetrahydrate) or a hydrated magnesium nitrate (e.g., magnesium nitrate hexahydrate). The Group IA metal nitrate may be lithium nitrate, sodium nitrate or potassium nitrate. The aqueous material may be water.

The salt may be a magnesium nitrate hexahydrate:potassium nitrate salt having a weight percentage ratio of magnesium nitrate hexahydrate:potassium nitrate of between 75:25 and 85:15, and the aqueous material may be between at least 33.3 and at least 37.2 percent by weight of the phase change material, the percent by weight of the aqueous material varying between at least 33.3 and at least 37.2 by weight of the phase change material in a direct relationship to the weight percentage of magnesium nitrate hexahydrate in the magnesium nitrate hexahydrate:potassium nitrate salt.

Alternatively, the salt may be a calcium nitrate tetrahydrate:lithium nitrate salt having a weight percentage ratio of calcium nitrate tetrahydrate:lithium nitrate of between 85:15 and 90:10, and the aqueous material may be at least 30 percent by weight of the phase change material.

As a further alternative, the salt may be a calcium nitrate tetrahydrate:potassium nitrate at a weight percentage ratio of between 85:15 and 90:10 calcium nitrate tetrahydrate:potassium nitrate, and the aqueous material may be between at least 27.9 and at least 29 percent by weight of the phase change material, the percent by weight of the aqueous material varying between at least 27.9 and at least 29 by weight of the phase change material in a direct relationship to the weight percentage of calcium nitrate tetrahydrate in the calcium nitrate tetrahydrate:potassium nitrate salt.

According to another aspect of the present invention, a method of making a density stabilized phase change material includes the steps of providing a salt of hydrated Group IIA metal nitrate and Group IA metal nitrate, and adding an effective amount of an aqueous material sufficient to cause the densities of the liquid and sold phases of said phase change material to be approximately equal during phase transformation.

The step of providing a salt may include the step of providing a salt of a hydrated Group IIA metal nitrate selected from the group consisting of hydrated calcium nitrate (e.g., calcium nitrate tetrahydrate) and hydrated magnesium nitrate (e.g., magnesium nitrate hexahydrate) and a Group IA metal nitrate selected from the group consisting of lithium nitrate, sodium nitrate and potassium nitrate.

The step of adding an aqueous material may include the step of adding water. Further, the step of adding the aqueous material to the salt may include the steps of heating the salt to the melting temperature of the salt, mixing the aqueous material into the heated salt, and agitating the mixture of aqueous material and heated salt.

The step of providing a salt may include the step of providing a magnesium nitrate hexahydrate:potassium nitrate salt having a weight percentage ratio of magnesium nitrate hexahydrate:potassium nitrate of between 75:25 and 85:15, and the step of adding an effective amount of an aqueous material may include the step of adding aqueous material such that the aqueous material is between at least 33.3 and at least 37.2 percent by weight of the phase change material, the aqueous material fraction varying between at least 33.3 and at least 37.2 percent by weight in a direct relationship to the weight percentage of magnesium nitrate hexahydrate in the magnesium nitrate hexahydrate:potassium nitrate salt.

Alternatively, the step of providing a salt may include the step of providing a magnesium nitrate hexahydrate:potassium nitrate salt having a weight percentage ratio of magnesium nitrate hexahydrate:potassium nitrate of between 85:15 and 90:10, and the step of adding an effective amount of an aqueous material may include the step of adding aqueous material such that the aqueous material is at least 30 percent by weight of the phase change material.

Further, the step of providing a salt may include the step of providing a magnesium nitrate hexahydrate:potassium nitrate salt having a weight percentage ratio of magnesium nitrate hexahydrate:potassium nitrate of between 85:15 and 90:10 and the step of adding an effective amount of an aqueous material may include the step of adding aqueous material such that the aqueous material is between at least 27.9 and at least 29 percent by weight of the phase change material, the aqueous material fraction varying between at least 27.9 and at least 29 percent by weight in a direct relationship to the weight percentage of magnesium nitrate hexahydrate in the magnesium nitrate hexahydrate:potassium nitrate salt.

According to yet another aspect of the invention a heat battery includes a passage through which a working fluid may pass, a container in heat exchange relationship with the passage, and a density stabilized phase change material disposed in the container. The phase change material includes a salt of hydrated Group IIA metal nitrate and a Group IA metal nitrate and an aqueous material, wherein the density of the phase change material in the solid phase is approximately equal during phase transformation to the density of the phase change material in the liquid phase. The hydrated Group IIA metal nitrate of the phase change material may be selected from the group consisting of calcium nitrate tetrahydrate and magnesium nitrate hexahydrate. Also, the Group IA metal nitrate may be selected from the group consisting of lithium nitrate, sodium nitrate and potassium nitrate. Additionally, the aqueous material may be water.

BRIEF DESCRIPTION OF THE DRAWINGS

FIG. 4 is a schematic representation of a heat battery according to the present invention.

DETAILED DESCRIPTION OF THE PREFERRED EMBODIMENT

Figure 1:
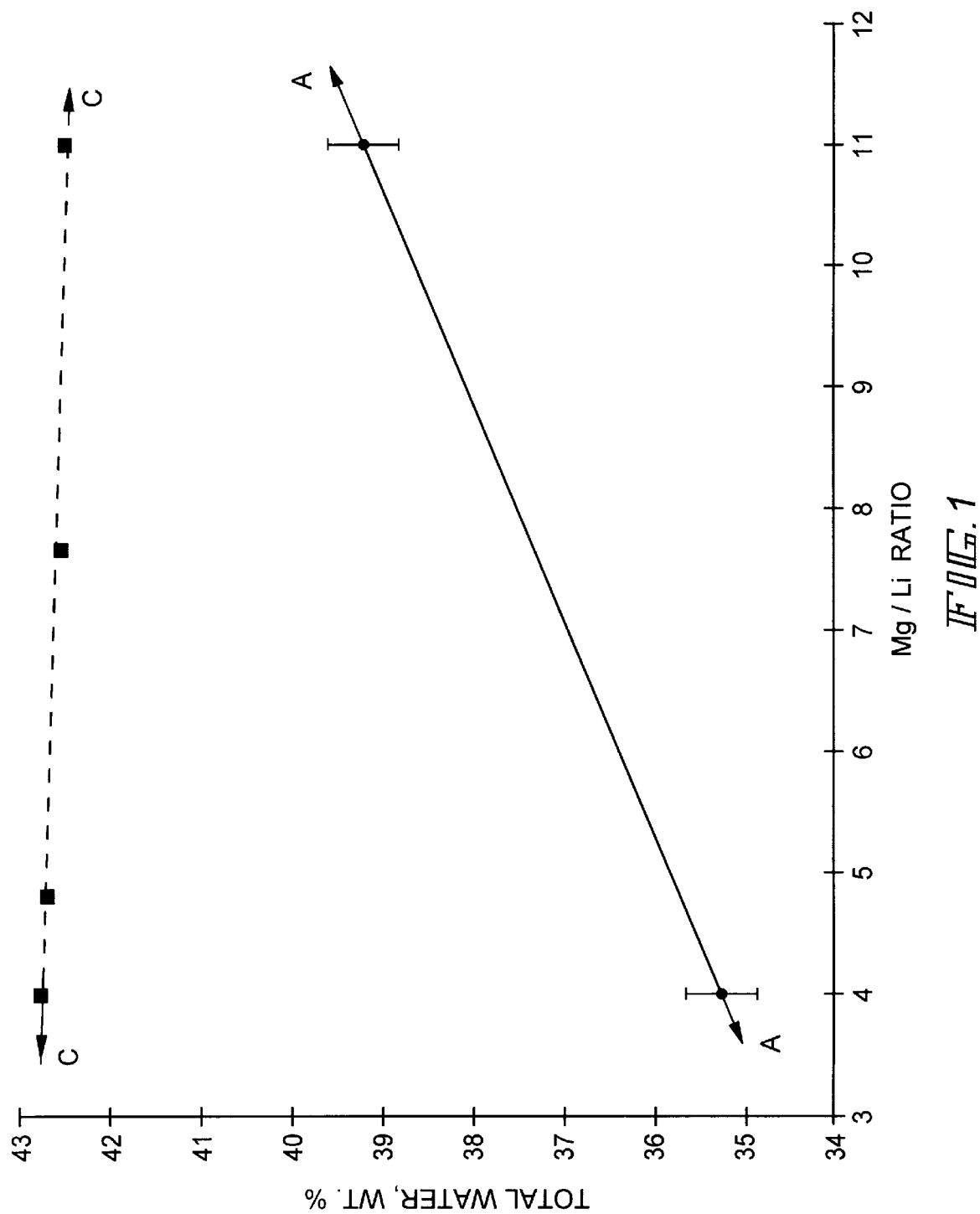
FIG. 1 is a plot of the minimum aqueous material required for density stabilization of an embodiment of the present invention.

It has been found that the addition of an aqueous material to a salt of a hydrated Group IIA (alkaline earth) metal nitrate and a Group IA (alkali) metal nitrate results in a phase change material which is density stabilized. That is, the addition of aqueous material to the salt of a hydrated Group IIA metal nitrate and a Group IA metal nitrate results in a phase change material wherein the solid and liquid densities are approximately equal during phase transformation. Moreover, the density stabilized phase change material has an energy storage capacity approximately equal to a non-density stabilized salt having the same ratio of hydrated Group IIA metal nitrate to Group IA metal nitrate.

With respect to the density stabilization achieved by the addition of aqueous material to the salt, it is believed the water added to the salt forms around the molecules of the Group IIA metal nitrate/Group IA metal nitrate salt, thereby weakening the attraction between the molecules. By weakening the attraction between the molecules in the solid phase, it is theorized that the density of the solid phase is lowered such that it is approximately equal to that of the liquid phase for a range of temperatures about and including the melting point temperature of the phase change material.

As an example, an embodiment of an density stabilized phase change material according to an embodiment of the present invention can be prepared by adding an aqueous material, such as water, to a salt of a hydrated magnesium nitrate, such as magnesium nitrate hexahydrate ($Mg(NO_3)_2 \cdot 6H_2O$), and lithium nitrate ($LiNO_3$). In particular, to achieve a density stabilized phase change material, it has been found that for a salt formed from magnesium nitrate hexahydrate and lithium nitrate in a ratio by weight of 92:8, at least about 39 percent by weight of the phase change material should be an aqueous material, such as water. Similarly, for a salt having a ratio of 85.3:14.7, enough aqueous material should be added such that at least about 37 percent by weight of the phase change material is aqueous material to achieve density stabilization. Moreover, for a salt having a ratio of 81:19, enough aqueous material should be added such that at least about 35 percent by weight of the phase change material is aqueous material. Additionally, it has been theorized that for a eutectic mixture of magnesium nitrate hexahydrate and lithium nitrate (ratio 83.7:16.3), enough aqueous material should be added to the salt so that a phase change material results wherein at least about 36.6 percent by weight of the phase change material is aqueous material.

These limits could also be expressed as follows. To form a density stabilized phase change material from a hydrated magnesium nitrate:lithium nitrate salt having 8.87 percent by weight magnesium, 0.8 percent by weight lithium, and 52.33 percent by weight nitrate at least about 39 percent by weight of the phase change material must be an aqueous material. Moreover, to density stabilize a salt having 8.09 percent by weight magnesium, 1.48 percent by weight lithium, and 54.13 percent by weight nitrate, at least about 37 percent by weight of the phase change material must be aqueous material. Furthermore, to density stabilize a salt having 7.69 percent by weight magnesium, 1.91 percent by weight lithium, and 56.7 percent by weight nitrate requires that at least about 35 percent by weight of the phase change material be aqueous material. Further, for a eutectic mixture having 7.94 percent by weight magnesium, 1.64 percent by weight lithium, and 55.14 percent by weight nitrate, it is theorized that at least about 36.6 percent by weight of the phase change material be aqueous material to produce a density stabilized phase change material.

As a further alternative expression of the formulation of the density stabilized phase change material, it could be said that as the magnesium fraction of the magnesium nitrate:lithium nitrate salt (or the phase change material) increases, the lithium fraction of the salt (or the phase change material) must decrease, and the minimum aqueous material fraction of the phase change material required to stabilize the phase change material must increase. That is, an inverse relationship exists between the magnesium fraction in the salt or the phase change material and the lithium in the to salt or the phase change material, and a direct relationship exists between the magnesium fraction in the salt or the phase change material and the aqueous material fraction in the phase change material. Therefore, as the magnesium fraction in the salt varies between 7.69 and 8.87 percent by weight of the salt, the minimum weight percent of aqueous material in the phase change material varies between at least about 35 percent and at least about 39 percent by weight of the phase change material in a direct relationship to the amount of magnesium initially present. Alternatively, as the ratio of magnesium nitrate hexahydrate:lithium nitrate initially in the salt varies from 81:19 to 92:8, the minimum weight percent of aqueous material in the phase change material varies from at least about 35 percent to at least about 39 percent by weight of the phase change material in a direct relationship to the percentage of magnesium present.

As a still further alternative expression of the formulation of the density stabilized phase change material, FIG. 1 is a graphical representation of the relationship between the minimum aqueous material required in the phase change material as a weight percentage of the phase change material and the weight ratio of the magnesium to lithium in the phase change material. The curve A—A and the area above the curve A—A represents the percentages of aqueous material required to stabilize a phase change material made of a salt of hydrated magnesium nitrate and lithium nitrate for a given weight ratio of magnesium to lithium. The area below the curve A—A represents those phase change materials wherein the density of the phase change material is not stabilized.

Figure 2:
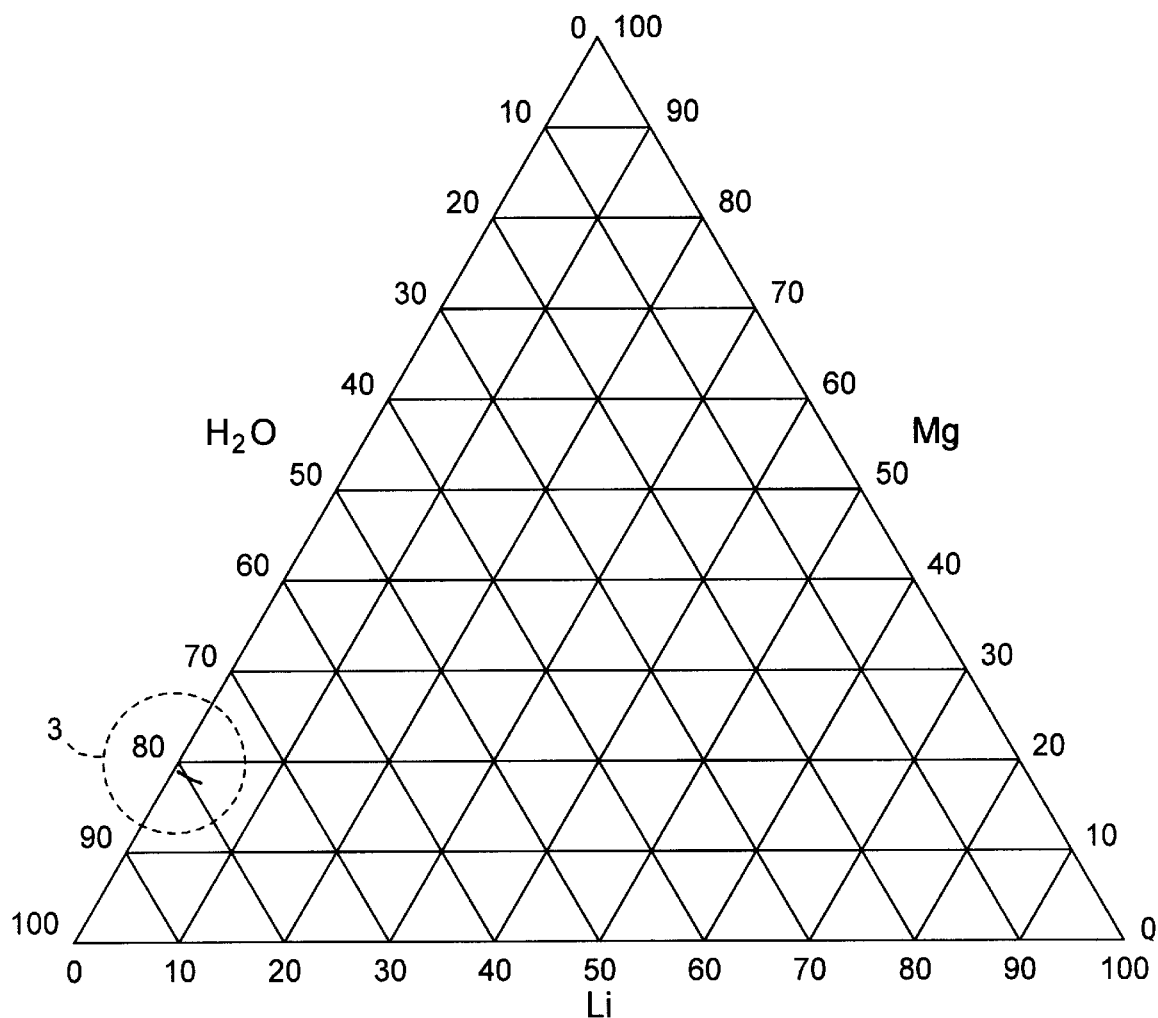
FIG. 2 is a ternary diagram of the percentages of lithium, magnesium and aqueous material required for density stabilization of an embodiment of the present invention.
Figure 3:
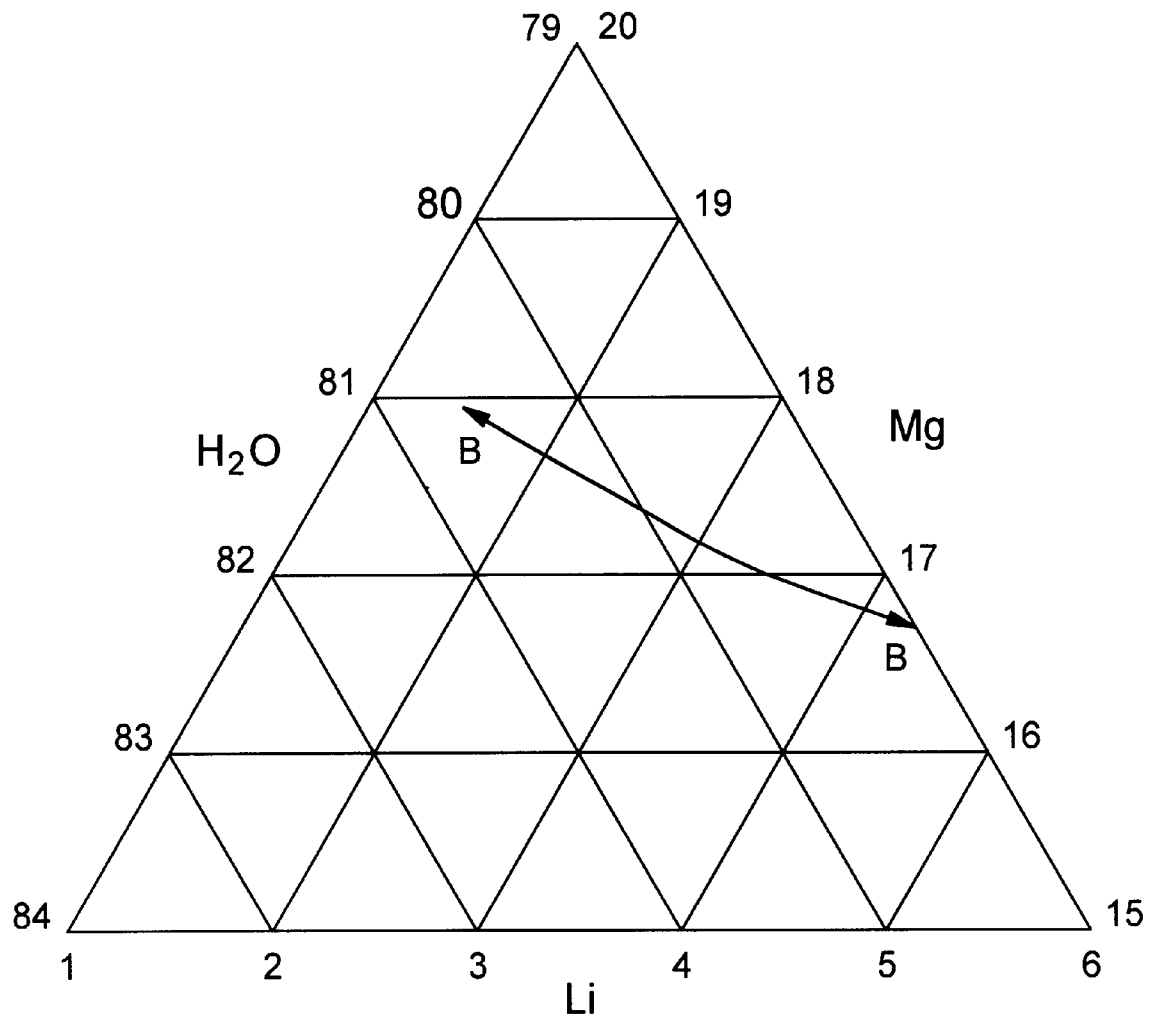
FIG. 3 is a fragmentary, enlarged view of the ternary diagram of FIG. 2.

Yet another expression of the formulation of the density stabilized phase change material is provided in FIGS. 2 and 3. FIGS. 2 and 3 are graphical representations of the relationship between the magnesium, lithium and aqueous material, chiefly water, in the phase change material, the weight percentages of each of the three components being shown relative to the total amount of magnesium, lithium and aqueous material in the phase change material, rather than to the total weight of the phase change material. It will be recognized that the graph in FIG. 3 is an exploded, fragmentary view of the ternary diagram of FIG. 2 for these three components, the portion of the overall range shown in FIG. 3 having been selected so that the relationships between the lithium, magnesium and aqueous material fractions can more easily illustrated, but not to limit the percentages represented to only those shown in FIG. 3. The area of the graph from the line B—B, below and to the left represents the percentages of the lithium, magnesium and aqueous material required to stabilize the phase change material taken as a fraction of the total amount of lithium, magnesium and aqueous material in the phase change material. The area above and to the right of the line B—B represents those phase change materials wherein the density of the phase change material is not stabilized.

Density stabilized phase change materials according to other embodiments of the present invention can be prepared using other Group IA and IIA metal nitrates. For example, a hydrated calcium nitrate, preferably in the form of calcium nitrate tetrahydrate, may be used instead of the hydrated magnesium nitrate. Additionally, sodium nitrate and potassium nitrate may be used in place of the lithium nitrate.

In particular, for a salt formed from a hydrated magnesium nitrate, in the form of magnesium nitrate hexahydrate, and sodium nitrate in a ratio by weight of 91:9, at least about 38.5 percent by weight of the phase change material should be water. Also, for a salt formed from a hydrated magnesium nitrate, in the form of magnesium nitrate hexahydrate, and potassium nitrate in a ratio by weight of 85:15, at least about 37.2 percent by weight of the phase change material should be water. Further, for a magnesium nitrate hexahydrate:potassium nitrate salt in a ratio by weight of 80:20, at least 35 percent by weight of the phase change material should be water, and for a ratio of 75:25, at least 33.3 percent should be water.

Similarly, for a salt formed from a hydrated calcium nitrate, in the form of calcium nitrate tetrahydrate, and lithium nitrate in a ratio by weight of 90:10 or 85:15, at least about 30 percent by weight of the phase change material should be water. In addition, for a salt formed from a hydrated calcium nitrate, in the form of calcium nitrate tetrahydrate, and sodium nitrate in a ratio by weight of 91:9, at least about 30 percent by weight of the phase change material should be water. Further, for a salt formed from a hydrated calcium nitrate, in the form of calcium nitrate tetrahydrate, and potassium nitrate in a ratio by weight of 90:10, at least about 29 percent by weight of the phase change material should be water, while for a ratio of 85:15, at least 27.9 percent should be water.

It has been theorized that a maximum can be reached for the aqueous material addition. Above this maximum, it is theorized that the water in excess of the amount necessary to stabilize the density of the phase change material will separate from the phase change material to form a two component system: one component being predominantly water and a second component being predominantly phase change material. One representation of this theoretically maximum for the phase change material formed from magnesium nitrate hexahydrate, lithium nitrate and water has been shown in FIG. 1 as dashed line C—C; line C—C represents a phase change material wherein there are at least six moles of water for each mole of magnesium, and three moles of water for each mole of lithium.

It is also known to introduce additives, such as nucleating agents and inhibitors, to the phase change material, and that the amount of water necessary to achieve density stabilization will vary according to the amount of the additive included, especially where the additive is itself hydrated. A nucleating agent, for example silica gel with 60–200 mesh, may be added to salts of calcium nitrate/lithium or sodium nitrate to achieve solidification of the phase change material; similarly, a nucleating agent in the form of magnesium hydroxide may be added to a salt of calcium nitrate/potassium nitrate. Additionally, lithium phosphate may be added as an inhibitor to reduce the acidity of the phase change material, thereby controlling corrosion. More preferably, water-soluble inhibitors, such as tetraborate, in the form of sodium tetraborate decahydrate, and/or a strong base, such as lithium hydroxide, sodium hydroxide, barium hydroxide, or potassium phosphate, may be added. Moreover, oxidizers, in the form of salts of molybdate and permanagate, for example, may be added to the phase change material to supply oxygen to repair the passivation film. Accordingly, it will be recognized by one of skill in the art that the percentage of water to be added will vary according to the amount of such nucleating agents and inhibitors added to the phase change material and the amounts of water added by such nucleating agents and inhibitors.

The aqueous material and other additives are added to the salt to produce the density stabilized phase change material according to the following method. First, a predetermined quantity of the salt of a hydrated Group IIA metal nitrate and a Group IA metal nitrate is placed in a container and heated to the molten state. The melting temperature of the phase change material will vary according to the composition of the salt, both with respect to the nitrates present and their relative concentrations. For example, the melting temperature for a near eutectic mixture of a magnesium nitrate hexahydrate:lithium nitrate salt is about 70° Centigrade, while the melting temperature for a composition of calcium nitrate tetrahydrate:potassium nitrate is about 30° Centigrade. Following melting, the molten salt is mixed to improve homogeneity. The molten salt can be transferred to a flask, which is sealed to prevent water loss from the salt if the salt is to be stored for any length of time.

While the salt is in its molten state, the aqueous material and other additives (such as nucleating agents and inhibitors, for example) are added, and the mixture is agitated, for example through the use of a magnetic stir bar. Again, the flask should be sealed after the addition of the water to prevent water from escaping from the phase change material during the agitation of the mixture.

EXAMPLES

Several test specimens were prepared according to a method similar to the one discussed above, and both qualitative and quantitative methods of measurement were performed on the specimens to confirm that the densities of the liquid and solid phases of the phase change materials prepared in accordance with the present invention were approximately equal for temperatures around the melting point temperature of the phase change material. Additionally, the energy capacity of several specimens was measured using differential scanning calorimetry.

The specimens were prepared by initially melting a sample of the salt in question. The size of the sample varied from salt to salt, with, for example, 1.0 kilogram of the magnesium nitrate/lithium nitrate salt being melted for preparation of the Group 1 specimens used below. Some of the molten salt sample was set aside and allowed to cool for water determination by Karl Fischer titration. Most of the molten salt sample was transferred into a 2 liter Erlenmeyer flask containing a magnetic stir bar. The Erlenmeyer flask was then sealed to prevent water loss.

Later, the specimen of the molten salt was transferred from the 2 liter Erlenmeyer flask to a 125 milliliter Erlenmeyer flask, also containing a magnetic stir bar. While the size of the specimen varied from salt to salt, a specimen size of 100 milliliters (between 150 and 160 grams) was used for the Group I tests. Water and a nucleating agent (Groups 4–6) were then added to the 125 milliliter flask through a transfer pipette, and the flask was sealed. The combination of the molten salt, water and the nucleating agent, if required, was then agitated to ensure complete mixing.

Test 1—Qualitative Measurements

A similar testing method was used for all of the qualitative tests reported herein. The specimen of the phase change material placed in the sealed 125 milliliter Erlenmeyer flask was allowed to cool to form a solid. The sample was then heated locally (on the bottom of the flask) to cause a phase transformation in the phase change material. Because liquids and solids are relatively incompressible, any significant decrease in density between the solid and the liquid phases caused the flask to break.

Group 1—$Mg(NO_3)_2$:$LiNO_3$

For the tests of Group 1, three sets of qualitative measurements were made, each set of measurements using a phase change material prepared from a salt with a different initial ratio of hydrated magnesium nitrate to lithium nitrate. The three salts tested had magnesium nitrate hexahydrate to lithium nitrate ratios of approximately 92:8 (salt 1), 85.3:14.7 (salt 2) and 81:19 (salt 3). The analyzed contents (in weight percent) of the lithium, magnesium and water for the salts were as follows: 8.87 Mg, 0.80 Li, 38.0 $H_2O$ (salt 1); 8.09 Mg, 1.48 Li, 36.3 $H_2O$ (salt 2); 7.69 Mg, 1.91 Li, 33.7 $H_2O$ (salt 3).

The results for the tests of Group 1 are provided in Tables 1, 2 and 3 for salts 1, 2 and 3, respectively.

TABLE 1

SALT 1

| Amount of water added (g $H_2O$/100 g salt) | Percent of water (water of hydration and water added -- by weight) | flask broke |
|---|---|---|
| 0 | 38 | yes |
| 1.01 | 38.6 | yes |
| 2.03 | 39.2 | no |
| 2.55 | 39.6 | no |
| 3.20 | 39.9 | no |
| 4.08 | 40.4 | no |
| 6.49 | 41.8 | no |

TABLE 2

SALT 2

| Amount of water added (g $H_2O$/100 g salt) | Percent of water (water of hydration and water added -- by weight) | flask broke |
|---|---|---|
| 0 | 35 | yes |
| 2.5 | 36.6 | yes |
| 3.0 | 36.9 | yes |
| 3.5 | 37.2 | no |
| 4.0 | 37.5 | no |
| 5.0 | 38.1 | no |

TABLE 3

SALT 3

| Amount of water added (g H$_2$O/100 g salt) | Percent of water (water of hydration and water added -- by weight) | flask broke |
| --- | --- | --- |
| 0 | 33.7 | yes |
| 1.01 | 34.4 | yes |
| 2.05 | 35 | yes |
| 2.48 | 35.3 | no |
| 3.04 | 35.7 | no |
| 3.92 | 36.2 | no |
| 6.14 | 37.5 | no |

Allowing for routine experimental uncertainties, a phase change material prepared from salt 1 with less than about 39 percent by weight water experienced a density variation between the solid and liquid phases great enough to break the flask. Those mixtures wherein at least about 39 percent by weight of the mixture was water did not experience the same dramatic density variation, and therefore the flask was not broken during the transformation of the mixture from the solid phase to the liquid phase. For salt 2, density stabilization occurred at about 37 percent by weight of water, and for salt 3, density stabilization occurred at about 35 percent by weight of water.

Group 2—Mg(NO$_3$)$_2$:NaNO$_3$

For Group 2, one set of qualitative measurements was made, the salt tested having a magnesium nitrate hexahydrate to sodium nitrate ratio of approximately 91:9. The results are provided in Table 4.

TABLE 4

| Percent of water (water of hydration and water added -- by weight) | flask broke |
| --- | --- |
| 37.0 | yes |
| 38.3 | yes |
| 38.7 | no |
| 40.5 | no |

Allowing for routine experimental uncertainties, density stabilization for this salt occurred at about 38.5 percent by weight of water.

Group 3—Mg(NO$_3$)$_2$:KNO$_3$

For the tests of Group 3, three sets of qualitative measurements were made, each set of measurements using a phase change material prepared from a salt with a different initial ratio of hydrated magnesium nitrate to potassium nitrate. The three salts tested had magnesium nitrate hexahydrate to potassium nitrate ratios of approximately 85:15 (salt 1), 80:20 (salt 2) and 75:25 (salt 3). The results for the tests of Group 3 are provided in Tables 5, 6, and 7 for salts 1, 2 and 3, respectively.

TABLE 5

SALT 1

| Percent of water (water of hydration and water added -- by weight) | flask broke |
| --- | --- |
| 36.8 | yes |
| 37.1 | yes |
| 37.4 | no |
| 37.7 | no |
| 38.2 | no |
| 38.6 | no |

TABLE 6

SALT 2

| Percent of water (water of hydration and water added -- by weight) | flask broke |
| --- | --- |
| 34.4 | yes |
| 34.8 | yes |
| 35.1 | no |
| 35.3 | no |
| 36.0 | no |
| 36.5 | no |

TABLE 7

SALT 3

| Percent of water (water of hydration and water added -- by weight) | flask broke |
| --- | --- |
| 32.4 | yes |
| 32.7 | yes |
| 33.1 | yes |
| 33.6 | no |
| 33.9 | no |
| 34.5 | no |

Allowing for routine experimental uncertainties, a phase change material prepared from salt 1 with at least about 37.2 percent by weight water experienced density stabilization. For salt 2, density stabilization occurred at about 35 percent by weight of water, and for salt 3, density stabilization occurred at about 33.3 percent by weight of water.

Group 4—Ca(NO$_3$)$_2$:LiNO$_3$

For the tests of Group 4, two sets of qualitative measurements were made, each set of measurements using a phase change material prepared from a salt with a different initial ratio of hydrated calcium nitrate to lithium nitrate. The two salts tested had calcium nitrate tetrahydrate to lithium nitrate ratios of approximately 90:10 (salt 1) and 85:15 (salt 2). The results for the tests of Group 4 are provided in Tables 8 and 9 for salts 1 and 2, respectively.

TABLE 8

SALT 1

| Percent of water (water of hydration and water added -- by weight) | flask broke |
| --- | --- |
| 26.3 | yes |
| 26.7 | yes |
| 27.1 | yes |
| 27.4 | yes |
| 27.8 | yes |
| 28.4 | yes |
| 29.4 | yes |
| 30.2 | no |
| 31.9 | no |

TABLE 9

SALT 2

| Percent of water (water of hydration and water added -- by weight) | flask broke |
| --- | --- |
| 25.3 | yes |
| 26.0 | yes |
| 26.8 | yes |
| 27.2 | yes |
| 27.8 | yes |
| 28.4 | yes |
| 29.3 | yes |
| 31.5 | no |

Allowing for routine experimental uncertainties, for salts 1 and 2, density stabilization occurred at about 30 percent by weight of water.

Group 5—$Ca(NO_3)_2$:$NaNO_3$

For Group 5, one set of qualitative measurements was made, the salt tested having a calcium nitrate tetrahydrate to sodium nitrate ratio of approximately 91:9. The results are provided in Table 10.

TABLE 10

| Percent of water (water of hydration and water added -- by weight) | flask broke |
| --- | --- |
| 27.7 | yes |
| 28.5 | yes |
| 28.9 | yes |
| 29.2 | yes |
| 29.8 | yes |
| 30.5 | no |
| 31.5 | no |

Allowing for routine experimental uncertainties, density stabilization for this salt occurred at about 30 percent by weight of water.

Group 6—$Ca(NO_3)_2$:$KNO_3$

For the tests of Group 6, two sets of qualitative measurements were made, each set of measurements using a phase change material prepared from a salt with a different initial ratio of hydrated calcium nitrate to potassium nitrate. The two salts tested had calcium nitrate tetrahydrate to potassium nitrate ratios of approximately 90:10 (salt 1) and 85:15 (salt 2). The results for the tests of Group 6 are provided in Tables 11 and 12 for salts 1 and 2, respectively.

TABLE 11

SALT 1

| Percent of water (water of hydration and water added -- by weight) | flask broke |
| --- | --- |
| 28.5 | yes |
| 28.9 | yes |
| 29.2 | no |
| 29.5 | no |
| 29.9 | no |
| 30.4 | no |

TABLE 12

SALT 2

| Percent of water (water of hydration and water added -- by weight) | flask broke |
| --- | --- |
| 27.0 | yes |
| 27.7 | yes |
| 28.1 | no |
| 28.5 | no |
| 29.1 | no |

Allowing for routine experimental uncertainties, for salt 1, density stabilization occurred at about 29 percent by weight of water, and for salt 2, density stabilization occurred at about 27.9 percent by weight of water.

Test 2—Quantitative Measurement

Additional samples were prepared using the salts of Group 1 and Group 3. The densities of the solid and liquid phases of these samples at temperatures about the melting point temperature were qualitatively measured according to the following methods:

Liquid Density

A pre-heated 50 milliliter graduated cylinder was placed on a top-loading balance. The weight of the cylinder was tared out, and between 10 and 45 milliliters of the molten sample material was added. The weight was recorded to the nearest 10 milligrams, and the volume was recorded to the nearest 0.25 milliliter. For Group 1, all measurements were made within 5 degrees of 90° C.; for Group 3, the measurements were made at about 90° C.

The density of the liquid phase was calculated by dividing the weight of the sample by the volume of the sample.

Solid Density

Different methods were used to calculate the solid densities for the specimens of Group 1 and Group 3.

For the specimens of Group 1, a 12 inch square of aluminum foil was placed on a flat surface. A small sample of the molten sample material used in the liquid density test was poured on the foil to produce a thin layer of molten sample material on the foil, which was then placed in a sealed container to prevent water loss or gain. The layer of molten sample material was then allowed to solidify (10–20 minutes). The foil was folded and the sample crushed.

A 50 milliliter graduated cylinder containing approximately 20 milliliters of an inert solvent, for example, mineral oil, was provided on a top loading balance. The weight of the cylinder and the solvent was tared out, and the volume of the solvent recorded. The crushed sample material was then transferred to the cylinder, and the weight recorded to the nearest 10 milligrams and the volume to the nearest 0.25 milliliters. All measurements were taken within 10 degrees of 60° Centigrade.

The density was determined by dividing the weight of the sample material by the change in the volume of the solvent with the addition of the crushed solid sample material to the cylinder.

For the specimens of Group 3, a 10 milliliter graduated cylinder containing approximately at least 7 milliliters of an inert solvent, for example, mineral oil, was placed on a top loading balance. The weight of the cylinder and the solvent was tared out and the volume of the solvent was recorded. Using a pre-heated glass transfer pipette, the salt in the molten state was transferred to the cylinder where the salt solidified. The weight of the salt was recorded to the nearest 10 milligrams and the volume to the nearest 0.1 milliliters.

The density was determined by dividing the weight of the molten material transferred to the cylinder by the change in the volume of the solvent with the addition of the molten material.

Because several specimens were used for salt 2 of Group 1, the results of the test have been summarized in the following table:

TABLE 13

| Water added (g $H_2O$/100 g salt) | Percent of water (water of hydration and water added -- by weight) | solid density (g/ml) | liquid density (g/ml) |
|---|---|---|---|
| 0.0 | 34.9 | 1.69 | 1.58 |
| 1.5 | 35.9 | 1.68 | 1.58 |
| 2.0 | 36.2 | 1.67 | 1.57 |
| 2.5 | 36.5 | 1.68 | 1.56 |
| 3.5 | 37.1 | 1.66 | 1.57 |
| 4.5 | 37.7 | 1.57 | 1.57 |
| 5.5 | 38.3 | 1.58 | 1.56 |

The results of the quantitative testing thus generally confirm the results of the qualitative testing within routine experimental uncertainties: when at least about 37 percent by weight of the phase change material formed from salt 2 of Group 1 was water, the solid and liquid densities were approximately equal, i.e. the densities were stabilized.

The results of the testing for specimens prepared from salts 1 and 3 of Group 1 with total water contents of 39.2 and 35.3 percent by weight, respectively, confirmed that the solid and liquid densities were approximately equal at 1.57 g/ml, within experimental uncertainty. Specifically, the solid and liquid densities for the salt 1 specimen were approximately equal, while the solid density of the salt 3 specimen was 1.58 g/ml and the liquid density was 1.57 g/ml.

Similarly, the results of the testing for specimens prepared from salts 1, 2 and 3 of Group 3 with total water contents of 37.4, 35.1 and 33.6 percent by weight, respectively, showed that the liquid and solid densities were approximately equal. For salt 1, the liquid and solid densities were 1.59 and 1.58 g/ml, respectively, while for salt 2, the densities were 1.61 and 1.62 g/ml and for salt 3, the densities were 1.62 and 1.64 g/ml.

Test 3—Energy Capacity

A differential scanning calorimeter was used to measure the energy capacity of seven samples of phase change materials prepared from salts 1 and 3 of Group 1, and two samples each of the phase change materials prepared using salt 2 of Group 1 and salts 1, 2 and 3 of Group 3. The following procedures were used to measure the energy capacities of the phase change materials.

For each test of the phase change material prepared from salts 1 and 3 of Group 1, two sample calorimetry cells were prepared, each with 10–30 mg of the phase change material. To begin, each of the sample calorimetry cells was weighed while empty. The phase change material to be tested was then melted in a closed container at 80° C. The molten phase change material was added to the sample cells, and the cells were sealed to prevent water loss to or gain from the environment. The cells were weighed again to determine the mass of the sample contained in the cell, and runs using the differential scanning calorimeter were performed.

For each test of the phase change material prepared from salt 2 of Group 1 and salts 1, 2 and 3 of Group 3, two sample calorimetry cells were prepared, one with a 5 gram sample and one with a 0.5 gram sample. Otherwise, the testing procedure for the salt 2 of Group 1 was the same as was used for the samples of the phase change materials prepared from salts 1 and 3 of Group 1, and similar (except for the melting temperature used) for the salts of Group 3.

The results of the tests are provided in Tables 14 and 15 for salts 1 and 3 of Group 1, respectively. The numbers presented represent an average of the test runs performed.

TABLE 14

GROUP 1 -SALT 1

| Amount of water added (g $H_2O$/100 g salt) | Percent of water (water of hydration and water added -- by weight) | Energy capacity (J/g) |
|---|---|---|
| 0 | 38 | 161 |
| 2.03 | 39.2 | 159 |
| 2.55 | 39.6 | 161 |
| 3.20 | 39.9 | 153 |
| 4.08 | 40.4 | 143 |
| 6.49 | 41.8 | 109 |

TABLE 15

GROUP 1 -SALT 3

| Amount of water added (g $H_2O$/100 g salt) | Percent of water (water of hydration and water added -- by weight) | Energy capacity (J/g) |
|---|---|---|
| 0 | 33.7 | 161 |
| 2.48 | 35.3 | 164 |
| 3.04 | 35.7 | 158 |
| 3.92 | 36.2 | 156 |
| 6.14 | 37.5 | 127 |

With respect to salt 2 of Group 1, the tests showed that the energy capacity of a phase change material prepared with approximately 1.4 grams of additional water (approximately 37.2 percent by weight water) was only 9.2 J/g less that the energy capacity of a salt with no water added (approximately 36.3 percent by weight water). For the salts of Group 3, the tests showed that the energy capacity of was essentially unchanged for a phase change material prepared from salt 1 with a total water content of 37.4 percent by weight, was only 2 J/g less for a phase change material prepared from salt 2 with a total water content of 35.1 percent be weight, and was only 6 J/g less for a phase change material prepared from a salt 3 with a total water content of 33.6 percent by weight.

As can be seen, over sizeable range of water additions, the energy capacity of the density stabilized phase change material according to the present invention remained approximately equal to the energy capacity of the non-density stabilized phase change material. Even with significant water additions, i.e. greater than 5 percent by weight of the starting material, it has been shown that the energy capacity of a phase change material according to an embodiment of the present invention remained above 100 J/g.

Exemplary Application

The density stabilized phase change material has the potential for wide-spread use in energy storage devices. A preferred example is shown in FIG. 4, that being an aluminum heat battery.

The heat battery, indicated as 10, includes a central housing 12 with an inner container 14 and an outer container 16, the inner container 14 being disposed within the outer container 16 with a first or insulating space 18 therebetween which may be filled with an insulation material or subject to a vacuum. A plurality of tubes 20 are arranged in the inner container 14, defining a second space 22 between the tubes 20 which is filled with the density stabilized phase change material. The heat battery 10 may also include a plurality of fins (not shown) which extend between the plurality of tubes 20.

The ends 24, 26 of the central housing 12 are sealed by end plates, of which a left end plate 28 is shown. The end plates also cooperate with covers or tanks 32, 34 to define header and tank constructions 36, 38 at both ends of the central housing 12 which are in fluid communication with the plurality of tubes 20.

In particular, the cover 32 has an inlet 40 and an outlet 42 attached thereto and in fluid communication with the interior space of the header and tank construction 36. Both covers 32, 34 have baffle plates 44, 46. The T-shaped baffle plate 44 (which is shown as one piece, but which could also be an assembly of two pieces) divides the header and tank construction 36 into three chambers, and separates the inlet 40 from the outlet 42. The baffle plate 46 separates the header and tank construction 38 into two chambers. The baffle plates 44, 46 thereby cause the fluid passing through the header and tank constructions 36, 38 and the tubes 20 to follow a serpentine path through the central housing 12.

In operation, a working fluid, such as engine coolant, enters the header and tank construction 36 through the inlet 40 and enters at least one of the tubes 20 disposed in the central housing 12. The working fluid passes through the tubes 20 to the header and tank construction 38, whereupon it enters another of the tubes 20 and returns to the header and tank construction 36. The working fluid then passes through still another of the tubes 20 to the header and tank construction 38, and another of the tubes 20 to the header and tank construction 36. The working fluid exits from the header and tank construction 36 through the outlet 42.

As the working fluid passes through the central housing 12, the working fluid exchanges heat through the walls of the tubes 20 with the phase change material contained in the second space 22. Specifically, if the temperature of the working fluid exceeds the temperature of the phase change material, then energy is transferred to the phase change material to heat the solid phase, to transform the phase change material from the solid phase to the liquid phase or to further heat the liquid phase, thereby storing energy in the battery. If the temperature of the working fluid is less than that of the phase change material, then energy is transferred to the working fluid from the phase change material to heat the fluid and to cool the liquid phase of the phase change material, to transform the phase change material between the liquid phase and the solid phase or to further cool the solid phase, thereby extracting energy from the battery.

Because the density of the phase change material contained in the second space 22 is density stabilized, cyclic deformation of the inner container 22, the tubes 20 and the fins (not shown) is not considered to be a problem. Consequently, a battery 10 using the phase change material of the present invention should have a longer life than a battery using a non-density stabilized phase change material, wherein the transformation of the phase change material causes deformation of the container, which in turn causes cracks to form in the passivation layer, which further in turn causes corrosion and the build up of corrosion gasses in the container, ultimately leading to battery failure.

Still other aspects, applications, objects, and advantages of the present invention can be obtained from a study of the specification, the drawings, and the appended claims.

We claim:

1. A phase change material including:
   a salt of an effective amount of hydrated Group IIA metal nitrate and an effective amount of Group IA metal nitrate that may exist in liquid and solid phases; and
   an effective amount of an aqueous material sufficient to cause the densities of the liquid and solid phases of said phase change material to be approximately equal during phase transformation.

2. The phase change material according to claim 1, wherein the hydrated Group IIA metal nitrate is selected from the group consisting of hydrated calcium nitrate and hydrated magnesium nitrate.

3. The phase change material according to claim 1, wherein the hydrated Group IIA metal nitrate is selected from the group consisting of calcium nitrate tetrahydrate and magnesium nitrate hexahydrate.

4. The phase change material according to claim 1, wherein the Group IA metal nitrate is selected from the group consisting of lithium nitrate, sodium nitrate and potassium nitrate.

5. The phase change material according to claim 1, wherein the aqueous material is water.

6. The phase change material according to claim 1, wherein:
   the salt is a magnesium nitrate hexahydrate:potassium nitrate salt having a weight percentage ratio of magnesium nitrate hexahydrate:potassium nitrate of between 75:25 and 85:15; and
   the aqueous material is between at least 33.3 and at least 37.2 percent by weight of the phase change material, the percent by weight of the aqueous material varying between at least 33.3 and at least 37.2 by weight of the phase change material in a direct relationship to the weight percentage of magnesium nitrate hexahydrate in the magnesium nitrate hexahydrate:potassium nitrate salt.

7. The phase change material according to claim 1, wherein:
   the salt is a calcium nitrate tetrahydrate:lithium nitrate salt having a weight percentage ratio of calcium nitrate tetrahydrate:lithium nitrate of between 85:15 and 90:10; and the aqueous material is at least 30 percent by weight of the phase change material.

8. The phase change material according to claim 1, wherein:

the salt is a calcium nitrate tetrahydrate:potassium nitrate of between 85:15 and 90:10; and the aqueous material is between at least 27.9 and at least 29 percent by weight of the phase change material, the percent by weight of the aqueous material varying between at least 27.9 and at least 29 by weight of the phase change material in a direct relationship to the weight percentage of calcium nitrate tetrahydrate in the calcium nitrate tetrahydrate:potassium nitrate salt.

9. A method of making a density stabilized phase change material, including the steps of:

providing a salt of an effective amount of hydrated Group IIA metal nitrate and an effective amount of Group IA metal nitrate that may exist in solid and liquid phases; and adding an effective amount of an aqueous material sufficient to cause the densities of the liquid and solid phases of said phase change material to be approximately equal during phase transformation.

10. The method according to claim 9, wherein the step of providing a salt comprises the step of providing a salt of a hydrated Group IIA metal nitrate selected from the group consisting of hydrated calcium nitrate and hydrated magnesium nitrate and a Group IA metal nitrate selected from the group consisting of lithium nitrate, sodium nitrate and potassium nitrate.

11. The method according to claim 9, wherein the step of providing a salt comprises the step of providing a salt of a hydrated Group IIA metal nitrate selected from the group consisting of calcium nitrate tetrahydrate and magnesium nitrate hexahydrate and a Group IA metal nitrate selected from the group consisting of lithium nitrate, sodium nitrate and potassium nitrate.

12. The method according to claim 9, wherein the step of adding an aqueous material comprises the step of adding water.

13. The method according to claim 9, wherein the step of adding the aqueous material to the salt comprises the steps of:

heating the salt to the melting temperature of the salt;
mixing the aqueous material into the heated salt; and
agitating the mixture of aqueous material and heated salt.

14. The method according to claim 9, wherein:

the step of providing a salt comprises the step of providing a magnesium nitrate hexahydrate:potassium nitrate salt having a weight percentage ratio of magnesium nitrate hexahydrate:potassium nitrate of between 75:25 and 85:15; and the step of adding an effective amount of an aqueous material comprises the step of adding aqueous material such that the aqueous material is between at least 33.3 and at least 37.2 percent by weight of the phase change material, the aqueous material fraction varying between at least 33.3 and at least 37.2 percent by weight in a direct relationship to the weight percentage of magnesium nitrate hexahydrate in the magnesium nitrate hexahydrate:potassium nitrate salt.

15. The method according to claim 9, wherein:

the step of providing a salt comprises the step of providing a magnesium nitrate hexahydrate:potassium nitrate salt having a weight percentage ratio of magnesium nitrate hexahydrate:potassium nitrate of between 85:15 and 90:10; and the step of adding an effective amount of an aqueous material comprises the step of adding aqueous material such that the aqueous material is at least 30 percent by weight of the phase change material.

16. The method according to claim 9, wherein:

the step of providing a salt comprises the step of providing a magnesium nitrate hexahydrate:potassium nitrate salt having a weight percentage ratio of magnesium nitrate hexahydrate:potassium nitrate of between 85:15 and 90:10; and the step of adding an effective amount of an aqueous material comprises the step of adding aqueous material such that the aqueous material is between at least 27.9 and at least 29 percent by weight of the phase change material, the aqueous material fraction varying between at least 27.9 and at least 29 percent by weight in a direct relationship to the weight percentage of magnesium nitrate hexahydrate in the magnesium nitrate hexahydrate:potassium nitrate salt.

17. A heat battery comprising:

a passage through which a working fluid may pass;
a container in heat exchange relationship with the passage; and
a density stabilized phase change material capable of existing in liquid and solid phases disposed in the container, the phase change material comprising a salt of an effective amount of a hydrated Group IIA metal nitrate and an effective amount of a Group IA metal nitrate and an effective amount of aqueous material, wherein the density of the phase change material in the solid phase is approximately equal during phase transformation to the density of the phase change material in the liquid phase.

18. The heat battery according to claim 17, wherein the hydrated Group IIA metal nitrate is selected from the group consisting of calcium nitrate tetrahydrate and magnesium nitrate hexahydrate.

19. The heat battery according to claim 17, wherein the Group IA metal nitrate is selected from the group consisting of lithium nitrate, sodium nitrate and potassium nitrate.

20. The heat battery according to claim 17, wherein the aqueous material is water.

* * * * *